Aug. 13, 1963         A. A. HARKINS         3,100,568
                      PROTECTIVE COVER
Filed April 19, 1962                     2 Sheets-Sheet 1
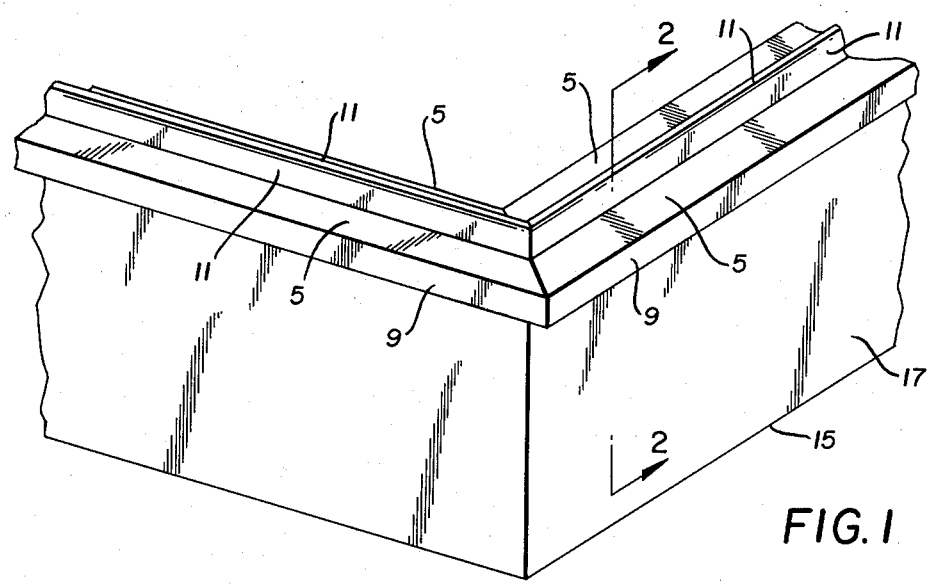
FIG. I
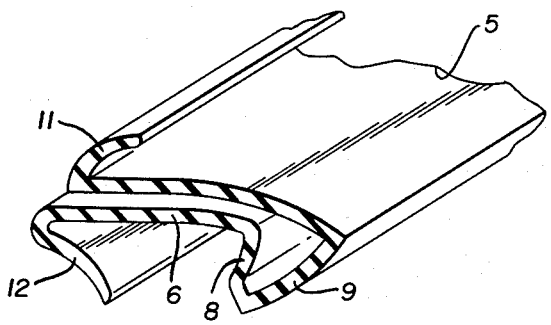
FIG. 6
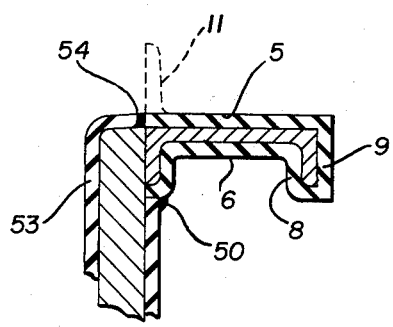
FIG. 5
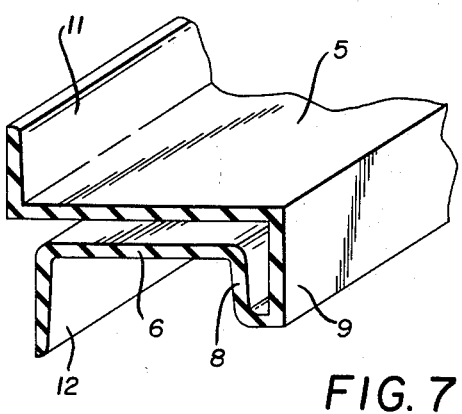
FIG. 7
INVENTOR.
ALLEN A. HARKINS
BY
ATTORNEY Aug. 13, 1963　　A. A. HARKINS　　3,100,568
PROTECTIVE COVER Filed April 19, 1962　　　　　　　　　　　　2 Sheets-Sheet 2

INVENTOR.
ALLEN A. HARKINS
BY
ATTORNEY

United States Patent Office 3,100,568
Patented Aug. 13, 1963

3,100,568
PROTECTIVE COVER
Allen A. Harkins, Akron, Ohio, assignor to The United States Stoneware Company, Tallmadge, Ohio, a corporation of Ohio
Filed Apr. 19, 1962, Ser. No. 188,637
6 Claims. (Cl. 206—2)

This invention relates to an extruded protective cover designed particularly for protecting the ferrous rim of a pickling tank. These rims are formed from one or two steel or iron channels which strengthen the wall. Often one channel is positioned with its middle resting on the wall of the tank; often a separate channel is fastened to each side of the wall near its top; also a single channel is often used fastened to the outside of the wall. The protective cover is composed of a relatively non-corrodible plastic such as a polymeric vinyl composition, or other polymeric material, etc.

The rim extends several inches from the wall, usually on both sides of the wall. A channel laid on the top of a wall may measure as much as ten inches from one edge to the other, although it may be somewhat narrower. The cover for such a channel is extruded in two parts, and a cover extruded to cover one half of such a rim formed of a channel supported at its middle, may also be used to cover a channel one edge of which is supported by the wall.

Prior to this invention, these rims on a pickling tank have been protected by covers built up from plastic sheets. The application of such covers is time-consuming and therefore expensive not only because of the labor required to fabricate the cover but also because of the time that the tank is out of production while the cover is being fabricated on to its rim. The extruded cover of this invention is quickly applied, and material savings result.

The invention is further described in connection with the accompanying drawings, in which—

FIGURE 1 is a view in perspective of a corner of a tank with one of the covers of this invention applied over a channel located on top of the wall;

FIGURE 5 is a section showing a single cover applied to a different rim structure;

FIGURE 6 is a view in perspective of the cover as extruded; and

FIGURE 7 is a view in perspective of the applied cover without showing any tank or rim.

Figure 2:
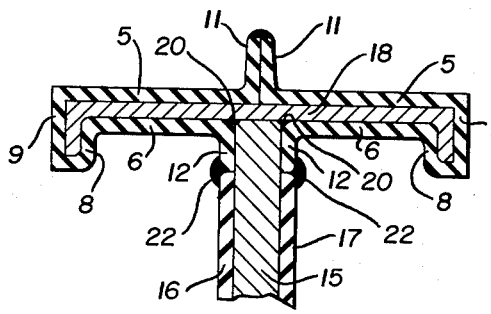
FIGURE 2 is a section on the line 2—2 of FIGURE 1.

The cover includes an upper expanse 5 and a lower expanse 6. These two expanses are connected by a V-shaped portion which includes a shorter arm 8 and a longer arm 9. The arms 8 and 9 are each connected to one edge of the expanses 5 and 6. The flange 11 extends upwardly from the other edge of the upper expanse, and the flange 12 extends downwardly from the other edge of the lower expanse.

The tank wall 15 can be of brick or steel or other suitable construction. The inner surface is coated with a lining 16 and the outer surface may also be coated as at 17. The channel 18 is located on the top of the wall with the middle of the channel fastened to the wall. If the wall is of steel the channel may be welded to it by the welds 20.

FIGURE 2 shows two cover members; one covering each half of the channel. The expanses 5 of the two cover members are somewhat wider than the expanses 6. The flanges 12 are brought together at the center of the top of the channel and cemented together as by fusing the top edges and preferably also cementing the contacting surfaces together. The bottom flanges are fused at 22 to the coatings 16 and 17. Alternatively, the flanges 12 may overlap the coatings and be fused in overlapping relation. Edges of the cover are mitered and fused together at the corners. The covers give complete coverage of the channel so that it is not attacked by any of the pickling liquid.

Figure 2A:
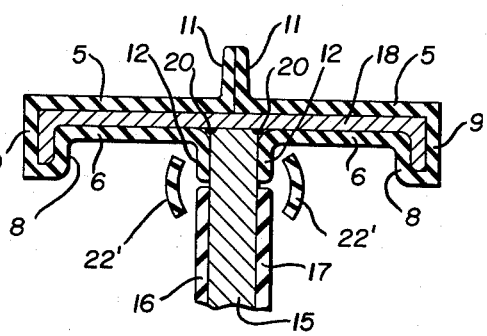
FIGURE 2A illustrates a modified structure in the process of being assembled.

FIGURE 2A illustrates a modification in which sealing strips 22' are used to unite flanges 12 to the covers 16 and 17. Covers 16 and 17 are shown as plastic covers, but may be any suitable type of protection.

Figure 3:
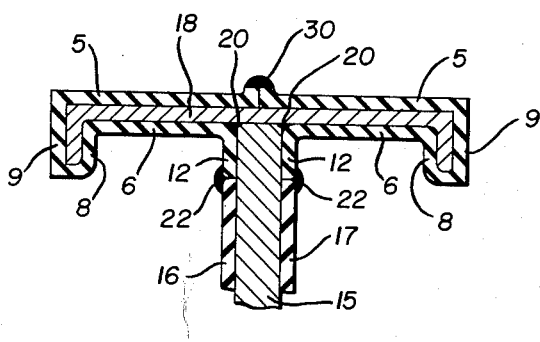
FIGURE 3 is a section showing two covers applied to the same rim in a somewhat different manner.

The structure shown in FIGURE 3 is identical to that shown in FIGURE 2 except that the flanges 11 of the two covers are trimmed short and welded together at 30 to form a relatively flat surface.

Figure 4:
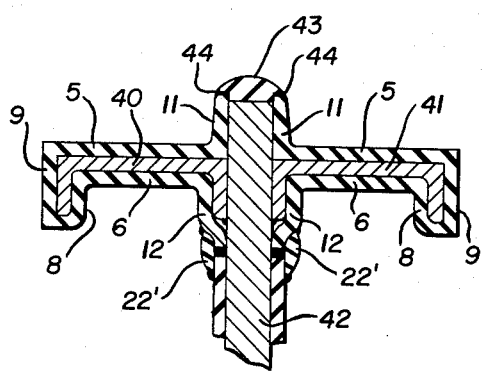
FIGURE 4 is a section showing two covers applied to a somewhat different rim structure.
Figure 4A:
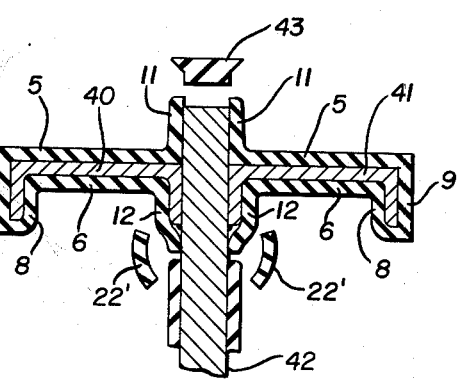
FIGURE 4A illustrates the same structure in the process of being assembled.

FIGURE 4 ilustrates a tank structure in which two channel irons 40 and 41 are located on opposite sides of the wall 42 of the tank. These channel irons are each individually covered by one of the covers. The flanges 11 are fastened to the upper part of the wall by cement or heat or other suitable means, and their ends protrude a short distance above the top of the wall. As shown in FIGURE 4A, a sealing strip 43 is placed along the top of the wall, and then fused to the flanges 11 at 44 as shown in FIGURE 4. The flanges 12 are sealed to the coatings on both sides of the tank, by sealing strips 22', as shown in FIGURE 4A. The sealing cap 43 is put in place, as indicated in FIGURE 4A, and fused at 44 to the flanges 11.

If there is but a single channel to form the rim, as illustrated in FIGURE 5, the flange 12 is united directly to the coating by fusion at 50 (as shown in FIGURE 5) or a sealing strip can be used. The flanges 11 is advantageously cut off, and a wide sealing strip 53 fused at 54 to the expanse 5, and fastened over the top of the wall. It may be brought down over the inside of the wall, or fused to a separate protective coating or covering on this wall surface.

Although the outer surface of the tank is illustrated as being coated, it is understood that this is not necessary.

The invention is covered in the claims which follow.

What I claim is:

1. In combination with a tank with a vertical wall having a horizontal channel supported at substantially its middle on the wall with each edge of the channel provided with a downwardly pointed projection, an extruded plastic protective cover on each side of the wall, each cover with an upper and lower expanse against the upper and lower surfaces of the channel extending in opposite directions from the wall, the upper expanse of the cover extended outwardly beyond its lower expanse with the outer edges thereof connected respectively to the upper ends of a V which covers said projection at that edge of the channel, and each with a downwardly directed flange at the inner edge of its lower expanse adhered to the wall, with flanges on the inner edges of the upper expanses adhered to one another.

2. In combination with a tank having a vertical wall and a horizontal channel attached to one side of it adjacent its top with a downwardly pointed projection at the outer end of the channel, an extruded plastic protective cover with upper and lower expanses covering the upper and lower surfaces of the channel and a V which covers the projection and is integral with said expanses.

3. The combination of claim 2 in which a flange integral with the inner edge of the lower expanse covers the portion of the tank wall immediately below the channel.

4. The combination of claim 2 in which the wall of the tank extends above the channel and the surface of the wall immediately above the channel is covered by a flange integral with the inner edge of the upper expanse of the cover.

5. The combination of claim 2 in which a second horizontal channel is attached to the other side of the wall with a downwardly pointed projection at its outer end, an extruded plastic protective cover with upper and lower expanses covering the upper and lower surfaces of the channel and a V with the top of its arms integral with the outer edges of the last named expanses covering the projection, the wall extending above both channels and flanges integral with the inner edges of the upper expanses of the respective covers covering the wall surfaces immediately above the respective channels, the top of the wall being covered by a sealing strip sealed to said flanges, and flanges integral with the inner ends of the lower expanses covering the wall surfaces immediately below the respective channels.

6. The combination of claim 2 in which the top of the channel is substantially flush with the top of the wall and a sealing strip which is sealed to the inner edge of the upper expanse covering the top of the wall.

References Cited in the file of this patent
UNITED STATES PATENTS 2,858,038     Dahm _____ Oct. 28, 1958